United States Patent [19]
Colella et al.

[11] Patent Number: 5,556,917
[45] Date of Patent: Sep. 17, 1996

[54] TOUGH GLOSSY POLYMER BLENDS

[75] Inventors: Michael B. Colella, Plantsville, Conn.; Michael Castriotta, Lancaster, Mass.

[73] Assignee: Novacor Chemicals (International) SA, Fribourg, Switzerland

[21] Appl. No.: 134,217

[22] Filed: Oct. 8, 1993

[51] Int. Cl.⁶ .................................................. C08L 51/04
[52] U.S. Cl. ...................... 525/71; 525/78; 525/80; 525/83; 525/84; 525/89
[58] Field of Search .................... 525/83, 89, 84, 525/71

[56] References Cited

U.S. PATENT DOCUMENTS

| | | | |
|---|---|---|---|
| 4,990,565 | 2/1991 | Blasius, Jr. | 525/71 |
| 5,237,007 | 8/1993 | Colella | 525/93 |
| 5,290,862 | 3/1994 | Blasius | 525/89 |
| 5,294,677 | 3/1994 | Hauser et al. | 525/89 |

FOREIGN PATENT DOCUMENTS

PCT/US91/
08309  11/1991  WIPO .

OTHER PUBLICATIONS

Chemical Abstracts 109:1171278v.
Chemical Abstracts 106:85901z.
Chemical Abstracts 112:8285y.
Chemical Abstracts 99:196070j.
Chemical Abstracts 111:8522c.

*Primary Examiner*—James J. Seidleck
*Assistant Examiner*—M. L. Warzel
*Attorney, Agent, or Firm*—Bruce E. Harang

[57] ABSTRACT

A polymer alloy is provided which comprises:
(I) from 10–50 parts by weight of an impact resistant styrene acrylate alloy which comprises (i) from 90 to 30 parts by weight of a brittle polymer (e.g. a styrene/alkyl (meth) acrylate copolymer, optionally with a (meth)acrylic acid comonomer), (ii) from 3 to 50 parts by weight of a rubbery polymer (e.g. a styrene/conjugated diolefin linear, tapered, radial di-block or tri-block copolymer), and (iii) from 15 to 67 parts by weight of a ductile polymer (e.g. a a styrene/conjugated diolefin linear, radial di-block or tri-block copolymer), and
(II) from 90 to 50 parts by weight of an impact modified styrene polymer.

The resulting polymer blends have good impact strength, tensile strength and gloss.

11 Claims, No Drawings

TOUGH GLOSSY POLYMER BLENDS

FIELD OF THE INVENTION

The present invention relates to novel polymer blends.

BACKGROUND OF THE INVENTION

Impact modified styrene polymers are well known in the plastics industry. Dispersion of particulate rubber tougheners throughout the resin matrix, enhance the impact strength of the styrene polymers. Typically, improvements in impact strength are obtained by incorporating ever increasing amounts of particulate rubber toughening agents. However, the resulting increases in impact strength is accompanied by a decrease in both tensile strength and surface gloss.

The polymer blends of the current invention provide materials with improved impact strength and surface gloss while maintaining reasonable tensile strength.

It is known in the art that some physical properties of styrenic or acrylic type polymers may be improved by alloying them with one or more additional polymers. In some cases, the resulting mixture can have improved mechanical properties, such as improved impact strength or toughness.

Chemical Abstracts 109: 171278v [*Polym. Prepr. (Am. Chem. Soc., Div. Polym. Chem.*) 1988, 29(2), 180-1] discloses that physical blends of block SBR (styrene content: 75.2 weight %) and a copolymer of methyl methacrylate and styrene are partially compatible. The morphological and mechanical properties of the blend are strongly dependent on tile molding/mixing process used to produce the blend. The SBR could only be toughened when the ideal morphology of the blend was obtained.

Chemical Abstracts 106: 85901z [JP 61/200, 151] discloses thermoplastic compositions comprising from 5 to 95 weight % of a block copolymer and from 95 to 5 weight % of a thermoplastic polymer (e.g. ABS). The block copolymer is derived from coupling an aromatic vinyl polymer block with an aromatic vinyl monomer-conjugated diene copolymer block. The subject thermoplastic compositions apparently have improved impact strength.

Chemical Abstracts 112: 8285y [JP 61/291,610] discloses the use of "impact modifiers" for thermoplastic polymers. The modifiers are basically similar to the block copolymer disclosed by Chemical Abstracts 106:85901z.

Chemical Abstracts 99: 196070j [JP 58/122,954] discloses improvement of anisotropy of a styrene hydrocarbon-conjugated diene block copolymer by blending it with a styrene-methacrylic ester copolymer. Such a blend, when extruded to form a molded plate, apparently possesses superior physical properties.

Chemical Abstracts 111: 8522c [JP 01/45614] discloses high-impact styrene polymer compositions comprises a major amount of a styrene (50 to 90 weight %)-conjugated diene (50 to 10 weight %) block copolymer and a minor amount of a styrene-based polymer (e.g. styrene-methyl methacrylate copolymer).

It would be desirable to have a composition which possesses a combination of improved properties, including improved impact strength while retaining gloss.

SUMMARY OF THE INVENTION

It is an object of the present invention to provide a novel polymer blend.

Accordingly, in one of its aspects, the present invention provides a polymer alloy comprising:
(i) from 10 to 50, preferably from 30 to 50, parts by weight of an impact resistant styrene acrylate polymer alloy; and
(ii) from 90 to 50, preferably from 70 to 50, parts by weight of a polymer comprising:
  (a) from 96 to 85 weight % of one or more $C_{8-12}$ vinyl aromatic monomers a portion of which are grafted to;
  (b) from 4 to 15 weight % of one or more polymers selected from the group consisting of polymers of $C_{4-6}$ conjugated diolefins; and copolymers comprising from 40 to 60 weight % of one or more $C_{8-12}$ vinyl aromatic monomers and from 60 to 40 weight % of one or more $C_{4-6}$ conjugated diolefins.

DESCRIPTION OF THE PREFERRED EMBODIMENTS

An impact resistant styrene acrylate polymer alloy suitable for use in the present invention is more fully described in PCT patent application PCT/US91/08309 filed Nov. 14, 1991 which became U.S. patent application Ser. No. 07/941,036 on Oct. 13, 1992, now U.S. Pat. No. 5,290,862.

Typically the impact resistant styrene acrylate polymer alloy comprises:
(i) from 30 to 85 parts by weight of a brittle polymer comprising:
  (a) from 90 to 30 weight % of one or more $C_{8-12}$ vinyl aromatic monomers which are unsubstituted or substituted by a $C_{1-4}$ alkyl radical;
  (b) from 10 to 70 weight % of one or more $C_{1-6}$ alkyl esters of $C_{3-6}$ ethylenically unsaturated carboxylic acids; and
  (c) frown 0 to 5 weight % of one or more $C_{3-8}$ ethylenically unsaturated carboxylic acids
(ii) from 3 to 50 parts by weight of a rubbery polymer comprising:
  (a) from 30 to 70, preferably from 40 to 55, weight % of at least one $C_{8-12}$ vinyl aromatic monomer; and
  (b) from 70 to 30, preferably from 60 to 55, weight % of at least $C_{4-6}$ conjugated diolefin; and
(iii) from 15 to 67 parts by weight of a ductile polymer comprising:
  (a) from 60 to 90, preferably from 70 to 80, weight % of at least one $C_{8-12}$ vinyl aromatic monomer; and
  (b) from 40 to 10, preferably from 30 to 20, weight % of at least one $C_{4-6}$ conjugated diolefin.

As used in the above noted PCT patent application specification:
"ductile" means a polymer having an elongation at break greater that 15%, as measured by ASTM D-638;
"rubbery" means a natural or synthetic polymer which, at room temperature can be stretched to at least twice its original length, and upon immediate release of the stress, will return to approximate original length;
"compatible" means two or more polymers which have good interfacial adhesion (for example a blend of the polymers exhibits physical properties approximate those expected from the rule of mixtures); and
"miscible" means two or more polymers which, when blended, remains clear, especially if the refractive indices of the polymers do not match.

A brittle polymer useful in component (i) of the present polymer blend may be selected from the group of polymers consisting of polymers comprising:

(i) from 90 to 30, preferably from 80 to 40, most preferably from 75 to 55, weight % of one or more $C_{8-12}$ vinyl aromatic monomers which are unsubstituted or substituted by a $C_{1-4}$ alkyl radical;

(ii) from 10 to 70, preferably from 20 to 60, most preferably frown 25 to 45, weight % of one or more $C_{1-6}$ alkyl esters of $C_{3-6}$ ethylenically unsaturated carboxylic acids; and (iii) from 0 to 5, preferably from 0 to 3, weight % of one or more $C_{3-6}$ ethylenically unsaturated carboxylic acids.

The $C_{8-12}$ vinyl aromatic monomer suitable for use in the brittle polymer of component (i) of the present polymer blends is not particularly restricted and nay be unsubstituted or substituted by a $C_{1-4}$ alkyl radical. Preferably, the $C_{8-12}$ vinyl aromatic monomer is selected from the group comprising styrene, α-methyl styrene, p-methyl styrene and t-butyl styrene. The preferred $C_8$–$C_{12}$ vinyl aromatic monomer is styrene.

The choice of $C_{1-4}$ alkyl ester of a $C_{3-6}$ ethylenically unsaturated carboxylic acid for use in producing the brittle polymer is not particularly restricted. Non-limiting examples of suitable esters include methyl acrylate, ethyl acrylate, methyl methacrylate, ethyl methacrylate, butyl acrylate and butyl methacrylate. The preferred ester is methyl methacrylate.

A brittle styrene acrylate polymer suitable for use in component (i) of the present polymer blends is a copolymer of styrene and methyl methacrylate. Preferably, such a copolymer comprises from 75 to 65 weight % styrene and from 25 to 35 weight % methyl methacrylate. Such a polymer is commercially available from Novacor Chemicals Inc. tinder the trademark NAS 30.

The production of a brittle polymer suitable for use in component (i) of the present polymer blends is within the purview of a person skilled in the art. Such polymers may be produced by suspension, solution, emulsion or bulk polymerization.

A ductile polymer useful in component(i) the present polymer blends may be derived from 60 to 90, preferably from 70 to 80, weight % of at least one $C_{8-12}$ vinyl aromatic monomer, and from 40 to 10, preferably from 30 to 20, weight % of at least one $C_{4-6}$ conjugated diolefin.

A ductile polymer suitable for use in tile present polymer alloys is a linear or radial di-block (vinyl aromatic monomer-conjugated diene) or tri-block (vinyl aromatic monomer-conjugated diene-vinyl aromatic monomer) copolymer. The production of such copolymers is known to those skilled in the art. Such polymers can be produced by living solution polymerization (e.g. using a lithium catalyst). Examples of suitable ductile polymers for use in the present invention are available from Phillips 66 Company and Firestone Synthetic Rubber and Latex Company.

A rubbery polymer suitable for use in component (i) of the present polymer blends is derived from 30 to 70, preferably from 40 to 55, weight % of at least one $C_{8-12}$ vinyl aromatic monomer, and from 70 to 30, preferably from 60 to 55, weight % of at least $C_{4-6}$ conjugated diolefin.

A rubbery polymer suitable for use in component (i) of the present polymer blends may be a linear, tapered, or radial di-block (aromatic vinyl monomer-conjugated diene) or a tri-block copolymer (vinyl aromatic monomer-conjugated diene-vinyl aromatic monomer). As is known in the art, a tapered di-block copolymer is a copolymer comprising a block which becomes progressively rich in one of the constituent monomers in a segment (typically, the end) of the block.

The process by which such a tapered copolymer is obtained is similar to the process by which block copolymers are obtained except that there is an incremental adjustment in the monomer feed (e.g. richer or poorer in vinyl aromatic/conjugate diolefin) to produce a block copolymer which is "tapered". Examples of suitable rubbery polymers for use in component (i) of the present polymer blends are commercially available from Dexco Polymers and Firestone Synthetic Rubber and Latex Company.

Suitable $C_{8-12}$ vinyl aromatic monomers for use in the ductile polymer and the rubbery polymers useful in component (i) of the present invention are not particularly restricted and may be unsubstituted or substituted by a $C_{1-4}$ alkyl radical. Preferably, the $C_{8-12}$ vinyl aromatic monomer is selected from the group comprising styrene, α-methyl styrene, p-methyl styrene and t-butyl styrene. A preferred $C_{8-12}$ vinyl aromatic monomer is styrene. Generally, the ductile polymer will contain a larger amount of vinyl aromatic monomer, typically in the range from 70 to 80 weight %; and the rubbery polymer will contain lower amounts of vinyl aromatic monomer, typically in the range 40 to 50 weight %.

The $C_{4-6}$ conjugated diolefin suitable for use in the ductile polymer and the rubbery polymer suitable for use in component (i) of the present polymer blends is not particularly restricted and may be unsubstituted or substituted by a chlorine atom. Preferably, the $C_{4-6}$ conjugated diolefin is selected from the group comprising 1,3-butadiene and isoprene.

The rubbery and ductile polymers suitable for use in component (i) of the present invention should at least be compatible. Preferably, the polymers will be miscible (as defined above).

The second component of the blends of the present invention comprises an impact modified $C_{8-12}$ vinyl aromatic polymer. The monomers suitable for use in polymerizing the superstrate polymer may be unsubstituted or substituted by a $C_{1-4}$ alkyl radical. The substrate rubber may be a co- or homopolymer of one or more $C_{4-6}$ conjugated diolefins or a copolymer of a $C_{8-12}$ vinyl aromatic monomer which is unsubstituted or substituted by a $C_{1-4}$ alkyl radical and a $C_{4-6}$ conjugated diolefin. Typically such polymers are prepared by dissolving the conjugated diolefin polymer in a part or all of the $C_{8-12}$ vinyl aromatic monomers and polymerizing the vinyl aromatic monomers while subjecting the mixture to shear. The reacting monomers under go phase inversion and the vinyl aromatic monomer and polymer become the continuous phase and the conjugated diolefin becomes the discontinuous phase. A portion of the vinyl aromatic polymer is grafted onto the substrate rubbery polymer. The conjugated polymer may be present in the impact modified vinyl aromatic polymer in an amount from about 4 to 15, typically from about 5 to 10 weight %.

Suitable vinyl aromatic monomers for use in the second component of the blends of the present invention include styrene, α-methyl styrene, p-methyl styrene, and t-butyl styrene. Suitable conjugated diolefins for use in the second component of the blends of the present invention include butadiene and isoprene. The conjugated diolefin to which the vinyl aromatic polymer is grafted preferably has a stereo configuration. In some cases the conjugated diolefin polymers may have a high cis configuration typically more than 90, preferably more than 95 weight %, while in other cases a medium cis content typically from about 50 to 65 weight % may be required.

The impact modified vinyl aromatic polymer of component (ii) of the blends of the present invention may be used in an amount from 90 to 50, preferably from 70 to 50 parts by weight.

The components of the blends of the present invention may be dry blended in, for example, a tumble blender. The resulting blend may then be extruded or injection molded. Suitable conditions for extrusion and/or injection molding are known in the art. The conditions will vary from machine to machine depending upon the wear and age of the machine. The precise conditions for any particular blend in any particular machine are determined by non-inventive experimentation. For example, for an inch and a half extruder having an L to D ratio of about 24:1, the extruder is operated at from 30 to 150, preferably from 50 to 135, most preferably from 75 to 100, RPM. During such operation, the barrel temperature of the extruder is in the range of from 190° to 240° C., preferably from 200° to 220° C.

Embodiments of the invention will be illustrated with reference to the following Examples which should not be construed so as to limit the scope of the present invention.

EXAMPLE 1

A number of polymer alloy samples were prepared using the following components:

COMPONENT

MODIFIER An impact resistant styrene acrylate polymer alloy available from Novacor Chemicals Inc. as P-610.

MIPS A medium impact polystyrene containing about 4% of polybutadiene (commercially available from Novacor Chemicals Inc. as NOVACOR 2400).

HIPS A high impact polystyrene containing about 8% of polybutadiene (commercially available from Novacor Chemicals Inc. as Novacor 4220).

The modifier (styrene acrylate alloy) was dry blended with either MIPS or HIPS and injection molded into a number of suitable specimens for conducting the following physical tests.

| Test | Identification |
|---|---|
| 20°, 60° Gloss | ASTM D-523 |
| Gardner Impact Strength | ASTM D-3029 |
| Tensile Properties | ASTM D-638 |

The amount of each component in the blend and the results of the physical testing are provided in Table 1, wherein all units are in parts by weight, unless otherwise indicated.

TABLE 1

| Modifier | MIPS | HIPS | Tensile Yield (psi) | Tensile Modulus (Kpsi) | Tensile Elongation (%) | Gardner Impact Strength 1/8" (in. lb.) | 20° Gloss | 60° Gloss |
|---|---|---|---|---|---|---|---|---|
| — | 100 | — | 6300 | 373 | 18 | 6.2 | 22.8 | 67.9 |
| 10 | 90 | — | 6050 | 397 | 24 | 6.8 | 50.2 | 88.3 |
| 30 | 70 | — | 5420 | 372 | 37 | 200 | 57.4 | 93.2 |
| 50 | 50 | — | 4830 | 337 | 54 | 294 | 72.1 | 97.0 |
| — | — | 100 | 3220 | 300 | 40 | 14 | 16.1 | 51.6 |
| 10 | — | 90 | 3290 | 316 | 43 | 89 | 31.7 | 75.9 |
| 30 | — | 70 | 2790 | 305 | 43 | 245 | 52.2 | 88.7 |
| 50 | — | 50 | 3390 | 268 | 55 | 272 | 52.7 | 88.9 |

The data shows that there is increasing impact strength, gloss, and elongation in the compositions when the modifier (e.g. impact resistant styrene acrylate polymer alloy) is present in an amount from 30 to about 50 parts by weight.

What is claimed is:

1. A polymer blend comprising:
   (i) from 10 to 50 parts by weight of an impact resistant styrene acrylate polymer alloy; and
   (ii) from 90 to 50 parts by weight of a polymer comprising:
      (a) from 96 to 85 weight % of one or more $C_{8-12}$ vinyl aromatic monomers a portion of which are grafted to;
      (b) from 4 to 15 weight % of one or more polymers selected from the group consisting of polymers of $C_{4-6}$ conjugated diolefins; and copolymers comprising from 40 to 60 weight % of one or more $C_{8-12}$ vinyl aromatic monomers and from 60 to 40 weight % of one or more $C_{4-6}$ conjugated diolefins.

2. The polymer blend according to claim 1, wherein in component (ii) said $C_{8-12}$ vinyl aromatic monomer is selected from the group consisting of styrene, α-methyl styrene, p-methyl styrene, and t-butyl styrene, and said conjugated diolefin is selected from the group consisting of butadiene and isoprene.

3. The polymer blend according to claim 2, wherein in component (ii) said $C_{8-12}$ vinyl aromatic monomer is styrene and said $C_{4-6}$ conjugated diolefin is butadiene.

4. The polymer blend according to claim 3, wherein component (i) comprises:
   (i) from 30 to 82 weight % of a brittle polymer comprising:
      (a) from 90 to 30 weight % of one or more $C_{8-12}$ vinyl aromatic monomers which are unsubstituted or substituted by a $C_{1-4}$ alkyl radical;
      (b) from 10 to 70 weight % of one or more $C_{1-6}$ alkyl esters of $C_{3-6}$ ethylenically unsaturated carboxylic acids; and
      (c) from 0 to 5 weight % of one or more $C_{3-6}$ ethylenically unsaturated carboxylic acids
   (ii) from 3 to 50 parts by weight of a rubbery polymer comprising;
      (a) from 30 to 70 weight % of said one or more $C_{8-12}$ vinyl aromatic monomers; and
      (b) from 70 to 30 weight % of said one or more $C_{4-6}$ conjugated diolefins; and
   (iii) from 10 to 29 parts by weight of a ductile polymer comprising;
      (a) from 60 to 90 weight % of said $C_{8-12}$ vinyl aromatic monomer; and
      (b) from 40 to 10 weight % of said $C_{4-6}$ conjugated diolefin.

5. The polymer blend according to claim 4, wherein in component (i) said brittle polymer said $C_{1-6}$ alkyl ester of a $C_{3-6}$ ethylenically unsaturated carboxylic acid is selected from the group consisting of methyl methacrylate, ethyl methacrylate, methyl acrylate, ethyl acrylate, butyl acrylate and butyl methacrylate; said $C_{8-12}$ vinyl aromatic monomer is selected from the group consisting of styrene, α-methyl styrene, p-methyl styrene, and t-butyl styrene.

6. The polymer blend according to claim 5, wherein in component (i) said ductile polymer is selected from the group consisting of linear or radial di- or tri-block copolymers of one or more $C_{8-12}$ vinyl aromatic monomers which are unsubstituted or substituted by a $C_{1-4}$ alkyl radical and one or more $C_{4-6}$ conjugated diolefin monomers.

7. The polymer blend according to claim 6, wherein in said ductile polymer said $C_{8-12}$ vinyl aromatic monomer is selected from the group consisting of styrene, α-methyl styrene, p-methyl styrene, and t-butyl styrene, and said conjugated diolefin is selected from the group consisting of butadiene and isoprene.

8. The polymer blend according to claim 7, wherein in component (i) said rubbery polymer is selected from the group of polymers consisting of tapered, linear, and radial di- and tri- block copolymers comprising block polymers of one or more $C_{8-12}$ vinyl aromatic monomers which are unsubstituted or substituted by a $C_{1-4}$ alkyl radical and block polymers of one or more $C_{4-6}$ conjugated diolefins.

9. The polymer blend according to claim 8, wherein in said rubbery polymer said one or more $C_{8-12}$ vinyl aromatic monomers is selected from the group consisting of styrene, α-methyl styrene, p-methyl styrene, and t-butyl styrene, and said one or more $C_{4-6}$ conjugated diolefins is selected from the group consisting of butadiene and isoprene.

10. The polymer blend according to claim 9, wherein component (i) is present in an amount from 30 to 50 parts by weight.

11. The polymer alloy according to claim 10, wherein component (ii) is present in an amount from 70 to 50 parts by weight.

* * * * *